US008270826B2

(12) United States Patent
Hjelmstrom (10) Patent No.: US 8,270,826 B2
(45) Date of Patent: Sep. 18, 2012

(54) CALIBRATION OF A LENS DEVICE (75) Inventor: Jonas Hjelmstrom, Staffanstorp (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 13/023,834

(22) Filed: Feb. 9, 2011

(65) Prior Publication Data

US 2011/0194851 A1    Aug. 11, 2011

Related U.S. Application Data

(60) Provisional application No. 61/304,124, filed on Feb. 12, 2010.

(30) Foreign Application Priority Data

Feb. 9, 2010    (EP) ................................. 10153060

(51) Int. Cl.
*G03B 7/087*    (2006.01)
*H04N 5/238*    (2006.01)

(52) U.S. Cl. ........................ 396/242; 348/363

(58) Field of Classification Search ............ 396/242; 348/363
See application file for complete search history.

(56) References Cited

U.S. PATENT DOCUMENTS

| 4,300,167 | A | * | 11/1981 | Miller et al. | 348/356 |
|---|---|---|---|---|---|
| 5,223,935 | A | | 6/1993 | Tsuji et al. | |
| 6,630,960 | B2 | * | 10/2003 | Takahashi et al. | 348/364 |
| 6,930,723 | B1 | | 8/2005 | Tsuda et al. | |
| 7,450,170 | B2 | * | 11/2008 | Terai et al. | 348/342 |
| 2003/0021376 | A1 | * | 1/2003 | Smith | 378/98.8 |
| 2003/0146986 | A1 | * | 8/2003 | Calderwood | 348/240.1 |
| 2007/0291161 | A1 | * | 12/2007 | Yamazaki et al. | 348/363 |
| 2008/0174678 | A1 | | 7/2008 | Solomon | |
| 2008/0252773 | A1 | | 10/2008 | Oishi | |

FOREIGN PATENT DOCUMENTS

| JP | 2008-172586 | 7/2008 |
|---|---|---|
| JP | 2008-233470 | 10/2008 |

OTHER PUBLICATIONS

European Search Report dated Jul. 21, 2010.
JP Office Action issued May 23, 2012, in Japanese Patent Application No. 2011-025514 (with English translation).

* cited by examiner

*Primary Examiner* — Rodney Fuller
(74) *Attorney, Agent, or Firm* — Oblon, Spivak, McClelland, Maier & Neustadt, L.L.P.

(57)    ABSTRACT

A calibration method in a camera with a P-Iris lens having an adjustable iris opening including the steps of adjusting the size of the iris opening between a first opening position and a second opening position, recording a plurality of images during the adjusting, analyzing the images, and determining an iris opening based on the analysis, that obtains a high quality image. The analyzing includes use of high frequency content in the recorded images.

18 Claims, 9 Drawing Sheets

CALIBRATION OF A LENS DEVICE

CROSS-REFERENCE TO RELATED APPLICATIONS

This application is related to and claims priority under 35 U.S.C. §119 (e) to Provisional Application Ser. No. 61/304,124, filed Feb. 12, 2010, and also claims the benefit of priority to European Patent Application No. 10153060, filed on Feb. 9, 2010, the contents of both of which are incorporated herein by reference.

TECHNICAL FIELD

The present invention relates to the field of camera devices and, in particular, to the calibration of a camera with a lens having an adjustable iris opening.

BACKGROUND OF THE INVENTION

The ability to control an iris opening of a camera lens plays an important role in image quality. An iris is used to maintain the optimal light level to the image sensor in the camera so that the image can be sharp, clear and correctly exposed with good contrast and resolution. The iris can also be used to control the depth of field in the image.

The iris opening can either be fixed or adjustable. The opening of a fixed iris cannot be adjusted, hence the name, and is fixed to a certain F-number. A fixed iris is often used in an indoor environment where the light level is more or less constant. The camera can compensate for changes in the light level by adjusting the exposure time and/or the gain of the image sensor.

An adjustable iris can either be manual or automatic. In a manual iris, the iris can be adjusted by manually turning a ring on the lens to either open or to close the iris. This is not convenient in an environment with changing light conditions such as outdoors.

There are two conventional types of automatic irises namely DC iris and video iris. Both types have a motor-driven automatically adjustable iris opening that responds to changes in the light level. Both types also use an analog signal (often an analog video signal) to control the iris opening. However, the main difference between the two types is where the circuitry for converting the analog signal into motor control signals is located. In a DC-iris lens, the circuit resides inside the camera, while in a video iris the circuitry resides inside the lens.

In situations with bright light, a camera with an automatic iris can be affected by diffraction and blurring if the iris opening becomes small. This problem is especially prominent in cameras with high resolution image sensors where the pixel size of the image sensor may be close to the diffraction limit of the camera optics. Therefore, the image quality in a camera is dependent on having an optimal iris opening for a given situation.

In order to optimize the image quality, a camera needs to have control over the iris opening inside the lens. The problem with conventional automatic iris lenses is that the control is not available to the camera or to the user of the camera. This is a severe disadvantage since it in this way makes it impossible to develop a control algorithm for controlling the optical performance of the camera. The depth of field, the resolution and the effect of optical aberration are also affected by not being able to control the absolute position of the iris opening.

The Precise-Iris lens, hereinafter referred to as P-Iris lens, is designed to address the shortcomings of an automatic iris lens. A P-Iris lens involves automatic and precise control of the iris opening (i.e. the diaphragm blades) with the aim of optimizing the image quality rather than controlling the light level. The P-Iris lens also provides improvements in contrast, clarity, resolution and depth of field, where objects at different distances from the camera are in focus simultaneously, all which are important parameters in the field of video recording, and especially in the field of video surveillance.

The P-Iris lenses iris is typically based on a stepping motor controlling the position of the diaphragm blades of the iris, and hence also the size of the iris opening. Each step of the stepping motor results in an increase or a decrease of the amount of incoming light reaching the image sensor. The amount of incoming light is a nonlinear function of the steps of the stepping motor, and is depending on the iris position. The steps, in F-number, are smaller when the iris is open and increases as the iris opening closes.

An important advantage of using a P-Iris lens having a stepping motor is that it may offer an absolute control of the position of the iris opening, which is not possible using a DC-iris. It is hence possible to set the iris to a specific aperture size by controlling the stepping motor. A motor driver is used to control the stepping motor in the lens. The basis for the control algorithm, run by the motor driver, is to maintain the iris opening in a predefined position for as long as possible under certain conditions. The predefined position, denoted position A, may for instance be based on the optimum position of the optical system or on a position set by the user defined by for example an F-number. The optimum is defined by the position where a high quality image in terms of parameters such as high contrast, low spherical aberration, low chromatic aberration, high resolution, low diffraction and a large depth of field, is achieved.

Apart from position A, a number of other iris positions matching certain light conditions may be predefined in an iris. For example a position B, corresponding to the diffraction limit of the system, and a position C, corresponding to a fully open iris position may be defined. Typically, the initial position for the iris at start-up is position A. If too much light reaches the image sensor the motor driver runs the stepping motor to iris position B, corresponding to the diffraction limit of the system. If not enough light reaches the image sensor, the motor driver runs the stepping motor to a fully open iris position (position C). At each position the integration time and/or the gain of the image sensor may be altered to optimize the image quality.

Together with the software, that is configured to optimize the performance of the lens and the image sensor, the P-Iris lens automatically provides the best iris position for optimal image quality in all light conditions. Thus, the P-Iris lens allows cameras to reach a new level of performance in image quality. The iris control will be especially beneficial for megapixel/HDTV cameras and demanding video surveillance applications.

To maintain the image quality during the transition time from one iris position to another it is important to let the stepping motor move the diaphragm blades in a pace adapted to give the exposure algorithm enough time to compensate for the changes in the incoming light using the gain and exposure time of the image sensor.

Different threshold values may determine when it is time to change the iris position. One threshold value could for example be defined as the brightness of the image at certain image sensor settings of the gain and exposure time. To prevent continuous movement of the stepping motor between two iris positions in a brightness region close to the threshold value, a hysteresis may be implemented in the control algorithm.

For some of the P-Iris lenses available on the market, the parameters needed for operating these lenses in an optimal way, such as the number of stepping motor steps to reach iris position A: optimum position, position B: diffraction limit (if too much light for optimum) and position C: fully open (when not enough light for optimum), have been measured by the manufacturer and hardcoded into the camera software. However, when a user wants to change the current lens into a P-Iris lens, for which there are no parameters coded into the camera software, the parameters must be made available to the camera in some way. One way of doing this is to manually enter the parameters, if provided by the manufacturer, into the camera. However, this inept way of manually having to make the parameters available to the camera can be quite tedious and time-consuming.

SUMMARY OF THE INVENTION

With the above and following description in mind, an aspect of the present invention is to provide a way to facilitate the procedure of making the parameters of the P-Iris lens available to the camera, and thus mitigate, alleviate, or eliminate one or more of the above-identified deficiencies in the art and disadvantages singly or in any combination.

An aspect of the present invention relates to a method in a camera comprising a lens device having an adjustable iris opening, comprising the steps of adjusting the size of the iris opening between a first opening position and a second opening position, recording a plurality of images during said adjusting, analyzing said images, and determining an iris opening, based on said analysis, that obtains a high quality image. A high quality image may be defined as an image having high contrast, low spherical aberration, low chromatic aberration, high resolution, low diffraction and a large depth of field. Between the first opening position and a second opening position a range of positions may be present, wherein each such position corresponds to a specific size of the iris opening. In one variant each such position in the range of positions between the first opening position and a second opening position corresponds to one stepping motor step. However, other configurations where the stepping motor steps and positions in the range of positions do not correspond to each other in a 1-to-1 fashion are also possible.

The method wherein the analysis may further comprise the steps of determining high frequency content in the recorded images, determining a high frequency value for each of the recorded images based on said determined high frequency content, and determining information representative of the size of the iris opening corresponding to a recorded image with a specific high frequency value. The information representative of the size of the iris opening may in one variant be the stepping motor step that corresponds to the iris opening for that particular recorded image.

The method wherein the recorded image with a specific determined high frequency value may further be the recorded image with the highest high frequency value.

The method wherein the determining of high frequency content may further comprise the steps of selecting subareas in the recorded images, and measuring the high frequency content in the selected subareas.

The method wherein the analysis may further comprise the steps of acquiring an absolute F-number corresponding to a specific iris opening, determining an exposure time and an image sensor gain in said recorded images, and calculating, based on the determined exposure time, image sensor gain and said absolute F-number, a correlation curve between a sequence of steps, wherein each step represents a specific size of the iris opening, and a sequence of F-numbers of the lens device.

The method wherein the determining of exposure time and image sensor gain may further comprise the steps of selecting subareas in the recorded images, and measuring the exposure time and image sensor gain in the selected subareas.

The method may further comprise the steps of determine a first F-number that is the highest F-number to obtain a high quality image with a predetermined level of light, determine a second F-number that corresponds to said specific high frequency value, and if the first F-number is lower than the second F-number the determining of the iris opening is based on the first F-number, and if the first F-number is higher than the second F-number the determining of the iris opening is based on the second F-number.

The method wherein the adjusting may further comprise providing a sequence of control signals to the lens device, wherein the sequence of control signals corresponds to a sequence of steps, each step representing a specific size of the iris opening.

The method wherein the first opening may be smaller than the second opening.

The method wherein the first opening may be larger than the second opening.

A second aspect of the present invention relates to a camera comprising a lens device having an adjustable iris opening, an adjusting unit for adjusting the size of the iris opening between a first opening position and a second opening position, a recording unit for recording a plurality of images during said adjusting, and an analysing unit for analyzing said images, and a first determining unit for determining an iris opening, based on said analysis, that obtains a high quality image.

The camera may further comprise a second determining unit for determining high frequency content in said recorded images, a third determining unit for determine a high frequency value for each of said recorded images based on said determined high frequency content, a fourth determining unit for determining information representative of the size of the iris opening corresponding to a recorded image with a specific high frequency value.

The camera wherein the recorded image with a specific high frequency value may be the recorded image with the highest high frequency value.

The camera wherein the second determining unit may further comprise a selecting unit for selecting subareas in the recorded images, and a fifth determining unit for determining high frequency content in the selected subareas.

The camera may further comprise an acquiring unit adapted for acquiring an absolute F-number corresponding to a specific iris opening, a sixth determining unit for determining, from the recorded images, an exposure time and an image sensor gain, and a calculating unit for calculating, based on the determined exposure time, image sensor gain and said absolute F-number, a correlation curve between the sequence of steps, wherein each step representing a specific size of the iris opening, and a sequence of F-numbers of the lens device.

The camera wherein the second determining unit may further comprise a selecting unit for selecting subareas in the recorded images, and a seventh determining unit for determining exposure time and image sensor gain in the selected subareas.

The camera may further comprise an eighth determining unit for determining a first F-number that is the highest F-number to obtain a high quality image with a predetermined level of light, a ninth determining unit for determining a second F-number that corresponds to said specific high frequency value, a second adjusting unit for adjusting the iris opening, wherein the adjusting of the iris opening is based on the first F-number if the first F-number is lower than the second F-number, or the second F-number if the first F-number is higher than the second F-number.

The camera wherein the adjusting unit may further comprise a providing unit for providing a sequence of control signals to the lens device, wherein the sequence of control signals corresponds to a sequence of steps, each step representing a specific size of the iris opening.

A third aspect of the present invention relates to a computer-readable medium having computer-executable components comprising instructions for a camera for adjusting the size of the iris opening between a first opening position and a second opening position, recording a plurality of images during said adjusting, analyzing said images, and determining an iris opening based on said analysis that obtains a high quality image.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION OF THE INVENTION

Embodiments of the present invention relate, in general, to the field of cameras and, in particularly, to the calibration of a camera using a P-Iris lens where parameters of the P-Iris lens are determined and made available to the camera.

Embodiments of the present invention will be described more fully hereinafter with reference to the accompanying drawings, in which embodiments of the invention are shown. This invention may, however, be embodied in many different forms and variants, and should not be construed as limited to the embodiments set forth herein. Rather, these embodiments are provided so that this disclosure will be thorough and complete, and will fully convey the scope of the invention to those skilled in the art. Like reference signs refer to like elements throughout.

Generally, a camera mainly consists of two parts. The first part is the lens which may be comprised of optical elements such as lenses and filters, mechanical parts, and electronic circuits for controlling the mechanical parts and for interfacing with external devices. The second part is the camera body which may be comprised of one or more image recording devices, mechanical parts, and electronic circuitry for processing information from the image recording devices and for interfacing with external devices such as a lens and a network. The lens may either be detachable from the camera body or integrated (non-detachable) with the camera body. A camera may be compatible with both DC iris and P-Iris lenses. Electronics in the camera body may automatically sense and/or determine if a lens, and in that case which type of lens, has been connected to the camera body at start-up, so that proper communication may be set-up between a lens control system in the camera body and the lens.

Figure 1:
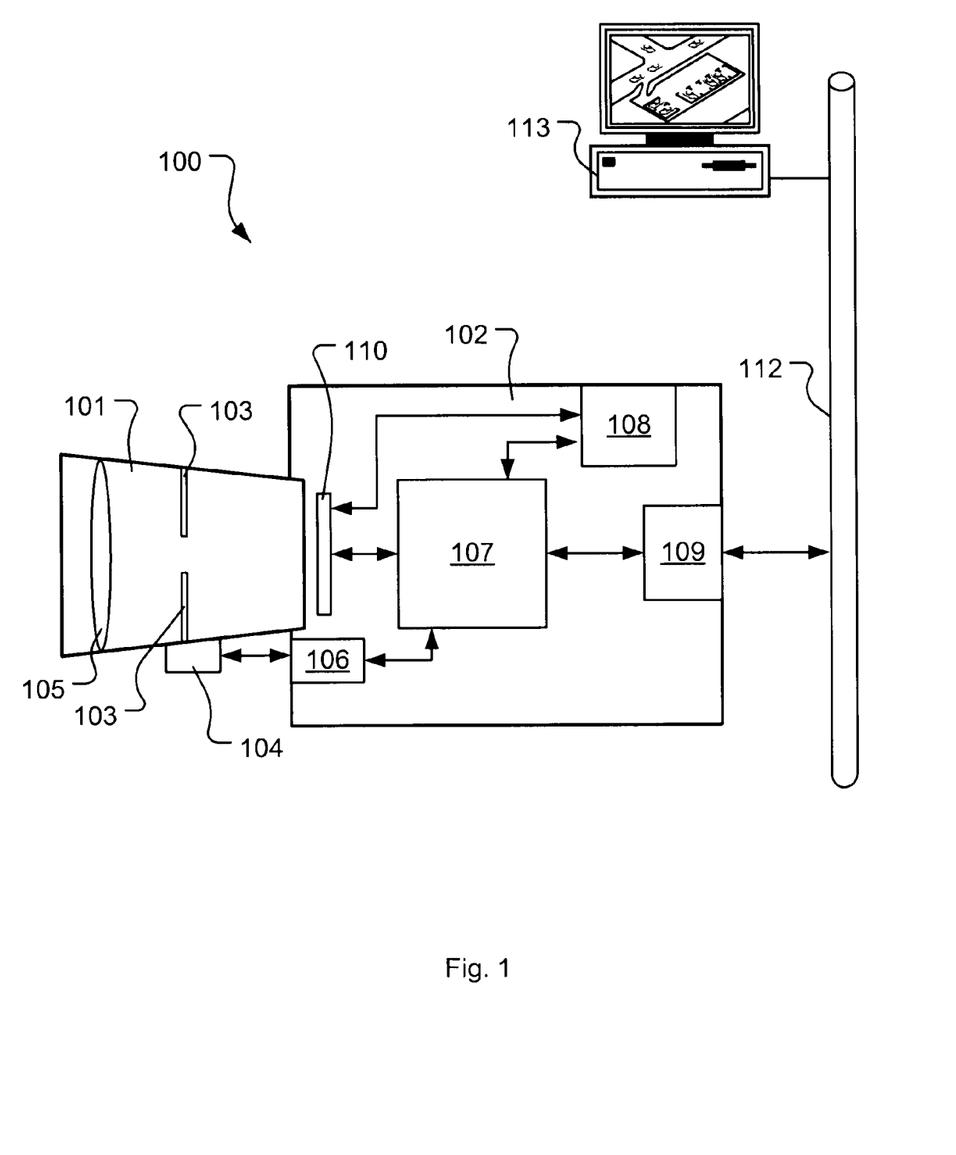
FIG. 1 illustrates a camera, comprised of a P-Iris lens and a camera body, connected to a network.

FIG. 1 shows a block diagram of a camera 100 in which embodiments of the present invention can be implemented. The P-Iris lens 101 in FIG. 1 may be comprised of optical elements 105 with at least one optical lens, an adjustable iris with at least two diaphragm blades 103, mechanical parts (not shown), electronic circuitry 104 containing a motor for controlling the diaphragm blades 103 of the adjustable iris, as well as means for communicating with electronic circuits in the camera body 102 via an interface 106.

In an embodiment of the present invention the electronic circuitry 104 in the P-Iris lens may also be comprised of processing means, capable of processing image data, one or several image sensors and memory storage for storing captured image data as well as results from the image processing. The motor within the electronic circuitry 104, controlling the diaphragm blades 103 in the P-Iris, may be implemented using a DC motor with position feedback, a galvanometer with a Hall element, an ultrasonic motor, a stepping motor, or any other type of micro motor capable of precise positioning of the diaphragm blades 103. From hereinafter a stepping motor is assumed when exemplifying embodiments of the present invention. The stepping motor is capable of controlling the diaphragm blades 103 in the P-Iris lens in discrete steps, from a position where light is not blocked by the diaphragm blades (here referred to as fully open position) to a position where the diaphragm blades are as closed as possible, or in some cases completely closed (here referred to as closed position). Thus, an adjustable iris is formed.

Thus, each stepping motor step relates to a specific position of the diaphragm blades 103 in the P-Iris lens 101 where a specific amount of light is let through. The size, shape, and number of diaphragm blades may vary. In one implementation two 'V'-shaped diaphragm blades may be used, while in another implementation several diaphragm blades forming a near perfect circular iris hole may be used.

The P-Iris lens 101 may be, as shown in FIG. 1, attached to a camera body 102. The camera body 102 may house at least one image sensor 110 capable of recording an image projected by the P-Iris lens 101 onto the surface of the image sensor 110. The image sensor 110 may typically be a charge-coupled device (CCD) or a complementary-metal-oxide-semiconductor (CMOS) active-pixel sensor, but is not in any way limited to only these two types of sensors. As mentioned earlier, the image sensor 110 may in one embodiment be implemented within the electronic circuitry 104 in the P-Iris lens 101 instead of in the camera body 102.

The camera 100 may be capable of recording still images as well as moving images. When recording an image from the image sensor 110 an image projected onto the image sensor is captured and translated into digital image data by the image sensor 110. The recorded image data may be sent to the processing means 107 for image processing, or to a memory 108 for storage, or both. The processing means 107 may be comprised of a collection of signal processors, central processing units (CPUs), application specific integrated circuits (ASICs), field-programmable gate arrays (FPGAs), and general electronic circuits. The processing means 107 are capable of performing several tasks in the camera such as doing analysis and calculations on captured and/or stored image data, controlling parameters of the image sensor 110 such as sensor gain and exposure time, storing and retrieving data from memory 108, communicating and controlling the P-Iris lens via the interface 106, and communicating, through a network interface 109, with other device connected to the network 112. One or more camera management stations 113, typically with user-interfaces, may be connected to the camera 100 via the network 112. The communication between the camera 100 and the network 112 may be via a wire connection or a wireless connection. The camera body 102 may, as mentioned above, house internal memory 108 where one or more recorded images may be stored as well as results and intermediate results from the calculations performed by the processing means 107. The memory 108 may in a variant be implemented as an external memory in the form of a removable memory device (i.e. USB memory device, external hard drive, solid state memory, etc.), while in another variant the memory may be localised in a network attached storage unit, personal computer, a server, or the like.

By connecting the camera 100 to a network 112 having a camera management station 113 connected to it, the camera 100 may be remotely operated. The remote operator may either be one or more persons, using the camera management user-interface, or a computerised operator such as a software program running on the camera management station 113. A network connected camera 100 may also be able to send image data to one or more remote parties connected to the network for remote processing.

In an Axis network camera with P-Iris lens the user-interface on the camera management station 113 is provided with a scale of F-numbers that corresponds to a range from a fully open to a closed iris opening. This feature enables the user to adjust the iris opening to a preferred position, which is the position used by the automatic control for most lighting conditions. In doing this the user at the same time adjusts the depth of field of the image.

When connecting a P-Iris lens 101 to a camera body 102 some parameters of the lens, which are needed for obtaining an optimal performance of the camera, are unknown. The unknown parameters may be any or all of the following:

The total number of stepping motor steps from the position where the iris opening is closed to the position where the iris opening is fully open.

The corresponding aperture, F-number, of each stepping motor step from the position where the iris opening is closed to the position where the iris opening is fully open.

The step that corresponds to the position of the iris opening which obtains the best image quality for a specific scene.

The total range of aperture, F-number, of the iris.

The step that corresponds to the iris opening position where diffraction starts.

If the P-Iris lens has been pre-calibrated with the camera body at the manufacturer, some or all of these parameters are known and may be hardcoded into the camera software. The specific P-Iris lens with known parameters may then be chosen in a roll-list in the camera management user-interface. The parameters may also be provided to the user of the lens to be manually entered into the camera or into the camera software controlling the lens. However, for some lenses all or some of these parameters are unknown thus making it impossible for the user to use the camera in an optimal way. The present invention provides a solution to the situation, where some or all of the parameters are unknown, by providing a method for automatic calibration of the camera using an unknown P-Iris lens.

Figure 2A:
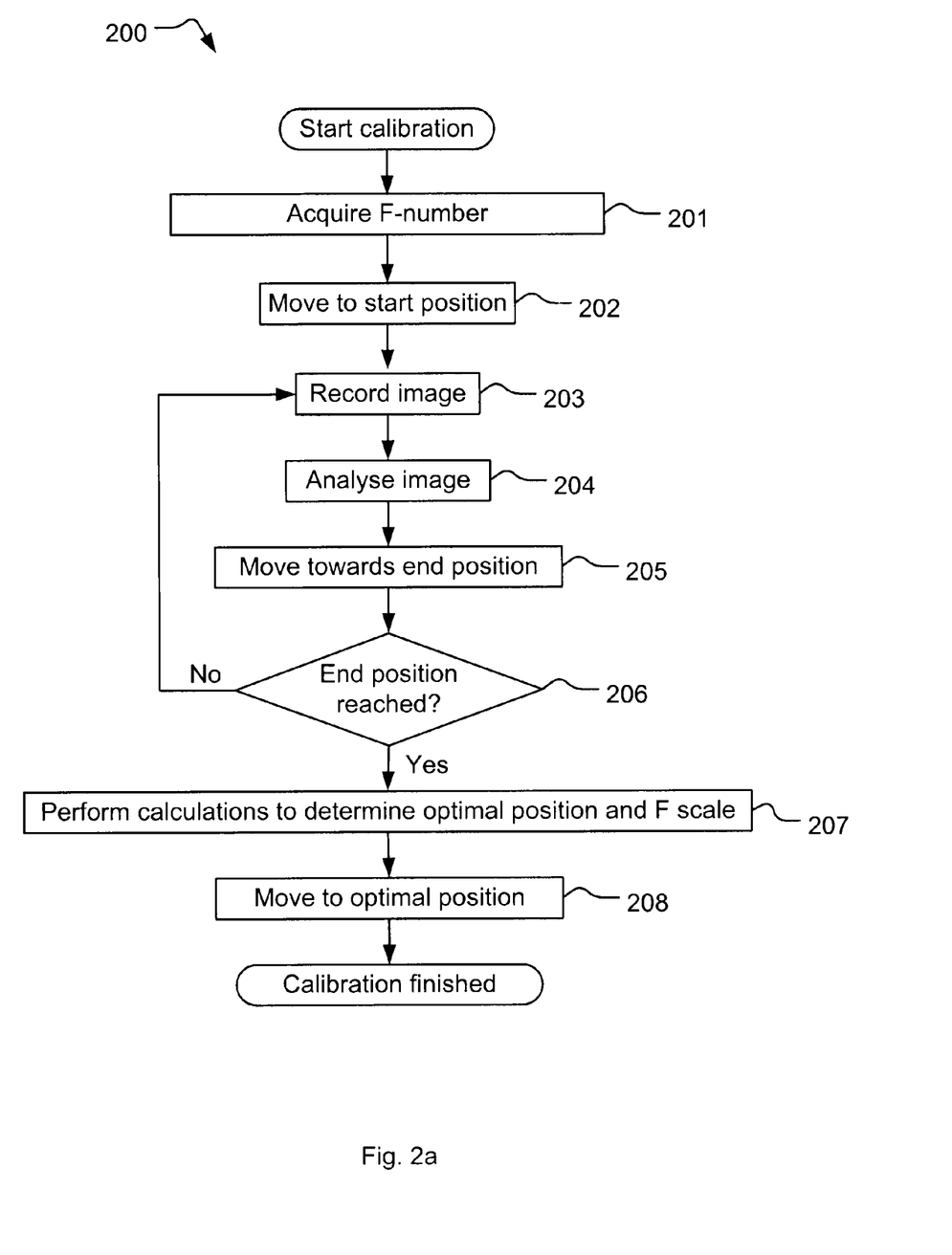
FIG. 2a shows a flowchart describing a calibration method for a camera using a P-Iris lens according to an embodiment of the present invention.

FIG. 2*a* shows a flowchart 200 describing an automatic calibration method for a camera 100 using a P-iris lens, according to an embodiment of the present invention. The calibration method will now be described in detail using a series of flowchart steps as depicted in FIG. 2*a*.

In the first flowchart step 201 in the calibration method an F-number is acquired for a specific known position of the iris opening (position of the diaphragm blades 103). This F-number must be acquired to be able to derive an absolute F-number scale in relation to the steps (i.e. position of iris opening) of the stepping motor. In most cases the F-number for the position where the iris is fully open is acquired, however in theory an F-number for any known position of the iris would be sufficient to later derive an absolute F-number scale in relation to the stepping motor steps.

The F-number may be entered manually via a dial or a roll-list on the exterior of the P-Iris lens 101 or on the camera body 102. The F-number may also be entered via a camera management user-interface 113 and downloaded via the network 112 to the processing means 107 of the camera. Alternatively the F-number may be pre-stored in a memory within the P-Iris lens and communicated to the processing means 107 of the camera via an interface 106 when a P-Iris lens 101 is attached to the camera body 102. Alternatively the F-number may in some cases be calculated from a calibration curve resulting from the calibration described hereinafter.

In flowchart step 202 the iris (i.e. the diaphragm blades 103) are moved into a start position. When a P-Iris lens 101 is mounted onto a camera body 102 the actual position of the iris opening (between fully open and closed) is unknown. Therefore, the second step 202 in the calibration moves the iris opening to a specific start position 202 using the stepping motor. One such start position is for instance where the iris opening is fully open. To reach the starting position the stepping motor is instructed to 'step' in the direction which opens the iris. To be sure that the fully opened position is reached the stepping motor is instructed to 'step' a large number of steps in the direction to open the iris. Before proceeding to the next step in the calibration the focus of the lens is adjusted so that a good focus is achieved. Preferably, the calibration should be performed, using the scene that is going to be surveilled (if possible), at a time when the level of light in the scene is reasonable constant. Objects giving rise to a slow variation of the light in a scene, such as clouds passing the sun, as well as objects giving rise to fast variations of the light in a scene, such as cars, people and animals passing or moving in the scene, may affect the calibration in a negative way. If possible, a point in time that minimises the likelihood of the occurrence of such variations should be chosen.

In the next flowchart step 203 of the calibration method one or more images are recorded by the image sensor 110. The data representing the image or images are sent to the processing means 107. Several images may be recorded and averaged into one image (i.e. image data) to reduce any noise. From hereinafter the word 'image' denoting both one and several images is going to be used.

The image data acquired in flowchart step 203 is analysed in flowchart step 204. Several different analyses 204 may be performed on the recorded image.

In a first embodiment of the present invention the high frequency content in a recorded image is determined by the processing means 107 using for instance a Sobel algorithm (i.e. discrete differentiation operator) and a Gaussian filter. The analysis of the high frequency content may result in a single value, from hereinafter referred to as a high frequency value (HF value), representing the amount of high frequency information that is present in a recorded image at the current position of the iris. The determined HF value may be stored in the memory 108. In a variant, a series of HF values are derived from a series of recorded images recorded at the same iris position. The series of HF values are then, for example, averaged into a single HF value. The averaging of a series of HF values will reduce the amount of noise and the negative effect of fast variations of the light in a scene, resulting in a more accurate HF value.

In a second embodiment the amount of light in an image may be determined. When arriving at a position the exposure algorithm will compensate for the light impinging on the image sensor 110 by adjusting the exposure time (i.e. integration time) and/or the gain of the image sensor 110. When the adjustment is done the value of the exposure time and the value of the gain of the image sensor 110 are stored in the memory 108. If multiple images have been recorded the average exposure time value and average gain value may be stored in the memory 108. In a variant the light intensity of the image is determined and stored in the memory 108. The light intensity of the current image may then be compared to the light intensity coming from at least one previously recorded image. The difference in light intensity between the two images may give information about if a stepping motor end position (closed or fully open) is reached or is close to be reached. It may also give information about in which direction the iris is moving (lighter-to-darker=iris is closing or darker-to-lighter=iris is opening). If the light intensity is changing in the "wrong" direction, compared to a reference direction, the calibration may in one embodiment be interrupted and restarted from flowchart step 202. In an embodiment, the information from the comparison may also be used to determine if the calibration should be terminated or not. If for example no change in light intensity is detected between two or more images the calibration may be terminated since an end position may have been reached or is very close to be reached.

In a third embodiment the HF value and the values of the exposure time and the gain of the image sensor 110 is determined and stored in the memory 108. If multiple images have been recorded the respective averaged values may be stored in the memory 108.

In flowchart step 205 of the calibration the stepping motor is moved one or more steps towards an end position. In one embodiment the stepping motor moves one (or several) step in the direction of closing the iris opening by moving the diaphragm blades 103 of the P-Iris 101 closer to each other. In yet another embodiment the stepping motor moves one (or several) step in the direction of opening the iris opening by moving the diaphragm blades 103 of the P-Iris 101 further apart from each other.

In flowchart step 206 of the calibration it is determined if an end position is reached or not. If the end position is not reached the steps: 'record image' 203, 'analyse image' 204, and 'move towards end position' 205 is repeated until an end position is reached, which for instance may be when the iris is closed or fully open.

In flowchart step 207 of the calibration, calculations to determine the optimal position of the iris and the F scale are performed. The optimal position and the F scale may be determined in several different ways as discussed further below.

Figure 3A:
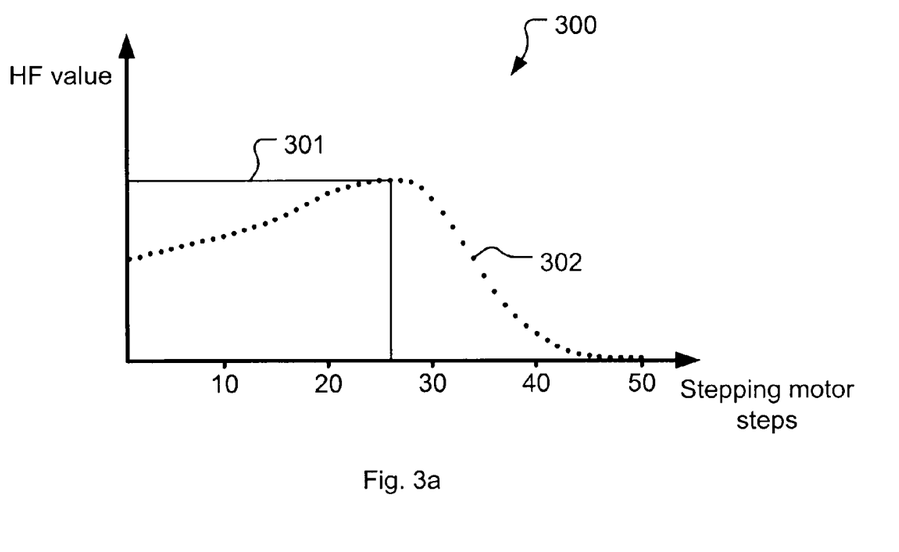
FIG. 3a shows an example of a diagram, with HF values on the y-axis and the number of steps corresponding to iris positions on the x-axis, which may be obtained during a calibration of a P-Iris lens.

FIG. 3*a* illustrates a way of determining an optimal position of the iris via the HF values according to an embodiment of the present invention. If the HF values and the corresponding stepping motor steps were plotted in a diagram 300, a curve similar to the curve 302 shown FIG. 3*a* would be achieved. In the example shown in FIG. 3*a* the full range between a fully open iris, at the stepping motor step equal to 1, to a closed iris, at the stepping motor step equal to 50, is 50 steps. The curve in the diagram has a mountain like shape where the steady increase in HF values in the beginning (step 1 to step 27) corresponds to an increase in image quality, while the decrease in HF values in the end (step 28 to step 50) corresponds to a decrease in image quality. The position with the largest HF value is the optimal position and corresponds to the stepping motor step (i.e. the position of the iris), given the current scenario, which produces the best image, i.e. where a high quality image is obtained. The optimal position value in the example in FIG. 3*a* is marked by solid lines going to the x- and y-axis. The highest HF value may be found by the processing means in the camera by comparing and/or sorting all stored HF values determined in the flowchart steps 202-206 in FIG. 2*a*.

Figure 3B:
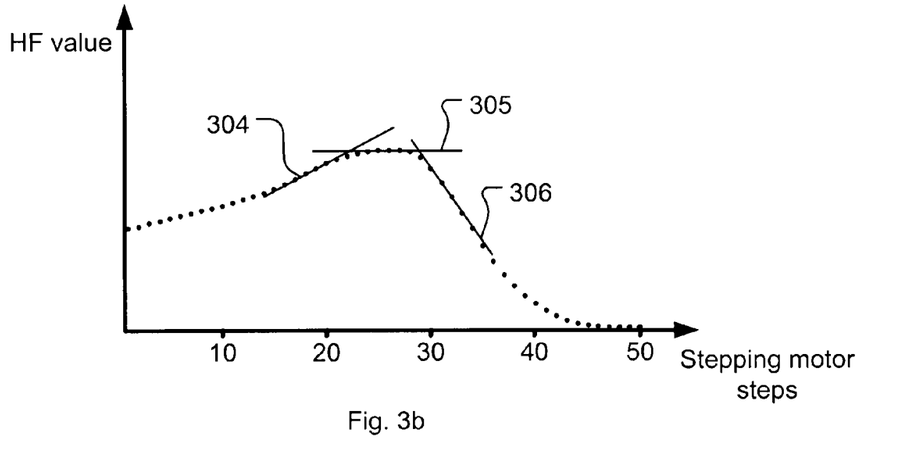
FIG. 3b shows another example of a diagram, with HF values on the y-axis and the number of steps corresponding to iris positions on the x-axis, which may be obtained during a calibration of a P-Iris lens.

FIG. 3*b* illustrates an alternative way of determining the optimal position of the iris via the HF values according to an embodiment of the present invention. In this example the derivative of each HF value, using one or more adjacent HF values, is calculated. If the derivative is positive, as shown by the line 304, there is an increase in the HF values which means that the largest HF value is not reached. If the derivative is negative, as shown by the line 306, there is a decrease in the HF values which means that the largest HF value has been passed. The largest HF value may be determined to be reached when the derivative is zero (or close to zero), meaning there is no (or very little) increase or decrease (i.e. close to parallel to the x-axis as shown by the line 305) between successive derivatives, or when the derivative changes its sign (going from a positive to a negative derivative or from a negative to a positive derivative).

The F scale, for all stepping motor steps in the range from a fully open iris to a closed iris, may be determined by calculating the F-number, from the exposure time and gain values stored in memory, for each stepping motor step. If the result from the calculation were to be plotted as a function of the stepping motor steps (each corresponding to a certain position of the iris) a curve similar to the curve 308 in the diagram 307 in FIG. 3*c* would be obtained. To be able to obtain an absolute F scale, at least one F-number for a specific stepping motor step must be known. The F-number for a specific stepping motor step may be obtained as described in flowchart step 201, or be calculated as follows using knowledge about the diffraction in the camera, if a distinct 'knee' is present in the HF curve.

Figure 4:
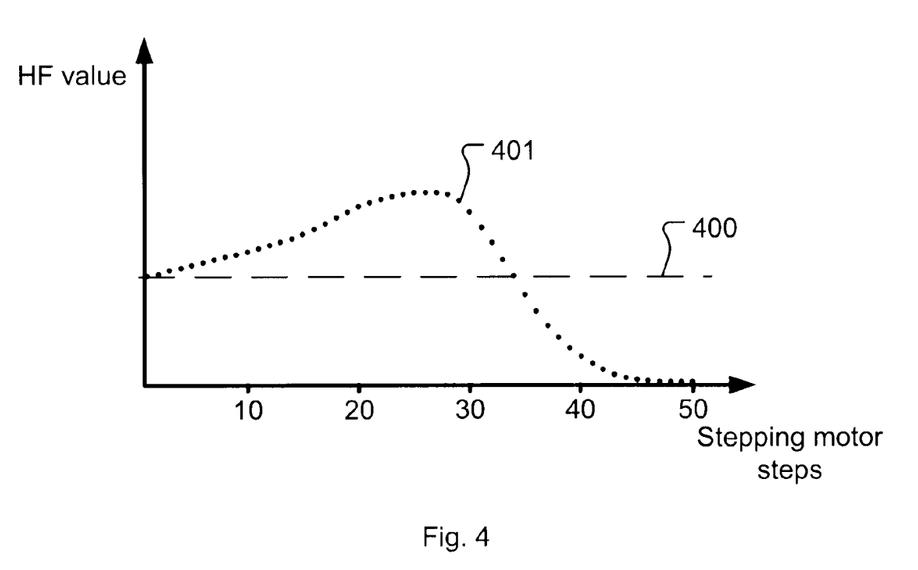
FIG. 4 shows an example of a diagram, with HF values on the y-axis and the number of steps corresponding to iris positions on the x-axis, which may be obtained during a calibration of a P-Iris lens.

The edges of the diaphragm blades in the P-Iris lens tend to disperse the light. As long as the iris opening is large (i.e. at large apertures) compared to the pixel size the diffracted light is only a small percentage of the total amount of light hitting the image sensor. When the iris opening gets smaller the amount of diffracted light becomes a larger percentage of the total amount of light being recorded. The point where diffraction comes into play and starts to affect the quality of the image can be seen in the HF curve in FIG. 4 as the point 401 where the curve starts to fall rapidly. In FIG. 4 the diffraction is presumed to start around stepping motor step 29. By knowing the pixel size of the image sensor a theoretical F-number at the diffraction point may be calculated. In this way the F-number for the stepping motor step 29 (where the diffraction starts 401) in FIG. 4 can be calculated and from that an absolute F scale can be derived.

Figure 3C:
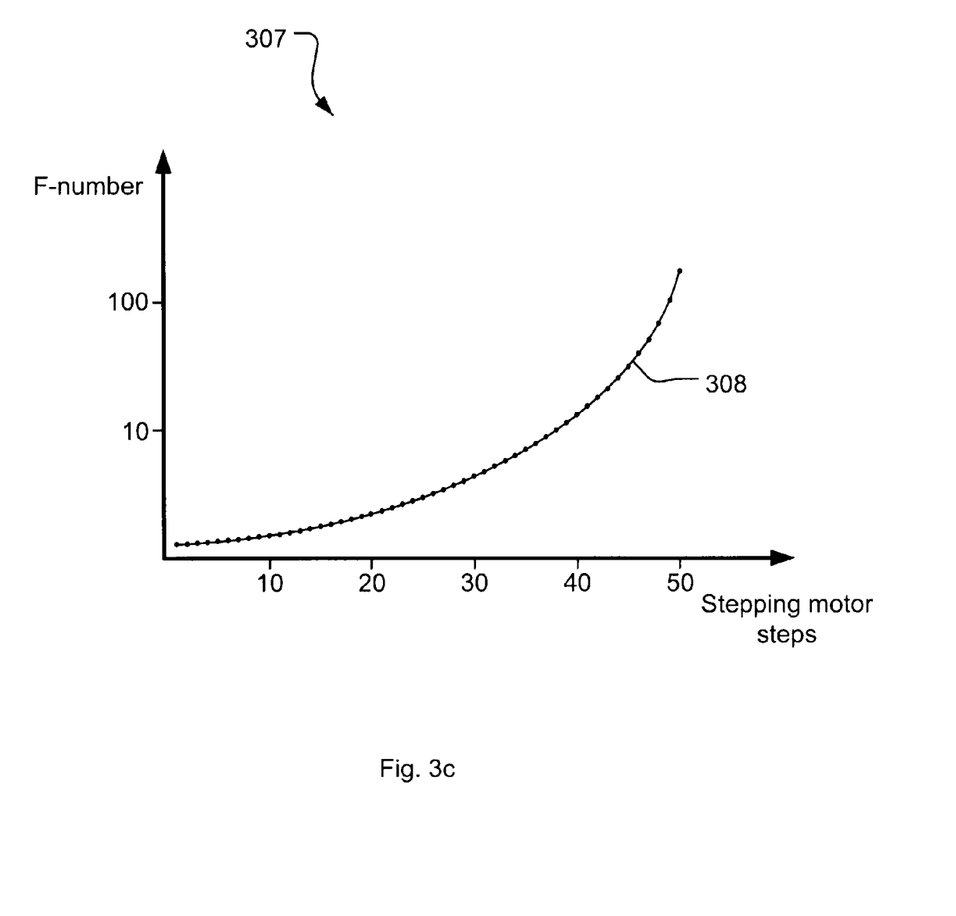
FIG. 3c shows an example of a diagram, with F-number on the y-axis and the number of steps corresponding to iris positions on the x-axis, which may be obtained during a calibration of a P-Iris lens.

From the stepping motor step to F-number curve, in FIG. 3c, the range of aperture in terms of F-numbers may be derived. By analysing the amount of light the stepping motor step for fully open and closed iris opening may be found, and the total amount of stepping motor steps may thus be calculated.

If a camera 100 with a low light sensitivity is placed in an environment with poor lighting conditions, the images at the determined optimal position may in some cases be too dark for practical use. This problem may be overcome, or reduced, by using a lower F-number than the F-number at the optimal position. A lower F-number will result in a larger aperture (i.e. larger iris opening) which will increase the amount of light reaching the image sensor 110, and thus producing a brighter image. To be able to determine an iris position that obtains the best high quality image given a certain light level the following steps may be implemented in the calibration according to an embodiment of the present invention.

A first F-number corresponding to the highest F-number that obtains a high quality image, given a predetermined level of light, is determined.

A second F-number corresponding to the specific high frequency value of the derived optimal position is determined.

The first and the second F-numbers are then compared to each other and if the first F-number is lower than the second F-number the determining of the iris opening is based on the first F-number, while if the first F-number is higher than the second F-number the determining of the iris opening is based on the second F-number.

These steps will ensure that an iris position that produces the best high quality image for a specific level of light is obtained.

If there is a need for a restriction on the depth of field being at least a certain length, and thereby compromise image quality, a minimum F-number need to be found through calculations including depth of field, focal length as well as the circle of confusion. The F-number calculated for the optimal position and this minimum F-number are compared and the higher F-number of the two should be chosen. From the F-curve the corresponding stepping motor step may be found When the optimal position and the F scale have been determined the next flowchart step 208 in the calibration is to adjust the iris opening (i.e. by moving the diaphragm blades 103) to the determined optimal position by stepping the stepping motor to the corresponding stepping motor step. When this is done the camera, for a given scenario, has been calibrated and its parameters are thereby known. The camera may now be used in a more optimal way than an un-calibrated camera.

If the optimal position is impossible to determine accurately using the HF curve in FIG. 3a (due to noise or to some other reason) other methods may be used. One such method would be to make a 'qualified guess' that the optimum position is at a certain stepping motor step. If the full range of stepping motor steps are 50 steps it can be 'guessed' that the position 25 stepping motor steps from start may be somewhere between a fully open iris opening and the point where diffraction starts, and would therefore be a position where the camera may obtain an image with decent image quality. This method is sub-optimal but may possible be better, in terms of image quality, than using a camera with a DC iris lens.

Another method would be to find the stepping motor step for diffraction with the help from the pixel size of the image sensor. The F-number for the point where the diffractions starts may be calculated with the help of the pixel size, as described earlier. The corresponding stepping motor step for diffraction can be found using the F-curve as discussed in conjunction with FIG. 3c. Since the stepping motor step for a fully open iris opening is known, the "optimum position A" should be chosen as a position somewhere in between that stepping motor step and the stepping motor step where diffraction starts. The "too little light position B" should be the stepping motor step for a fully open iris opening, and the "too much light position C" should be close to the stepping motor step where diffraction starts.

Figure 2B:
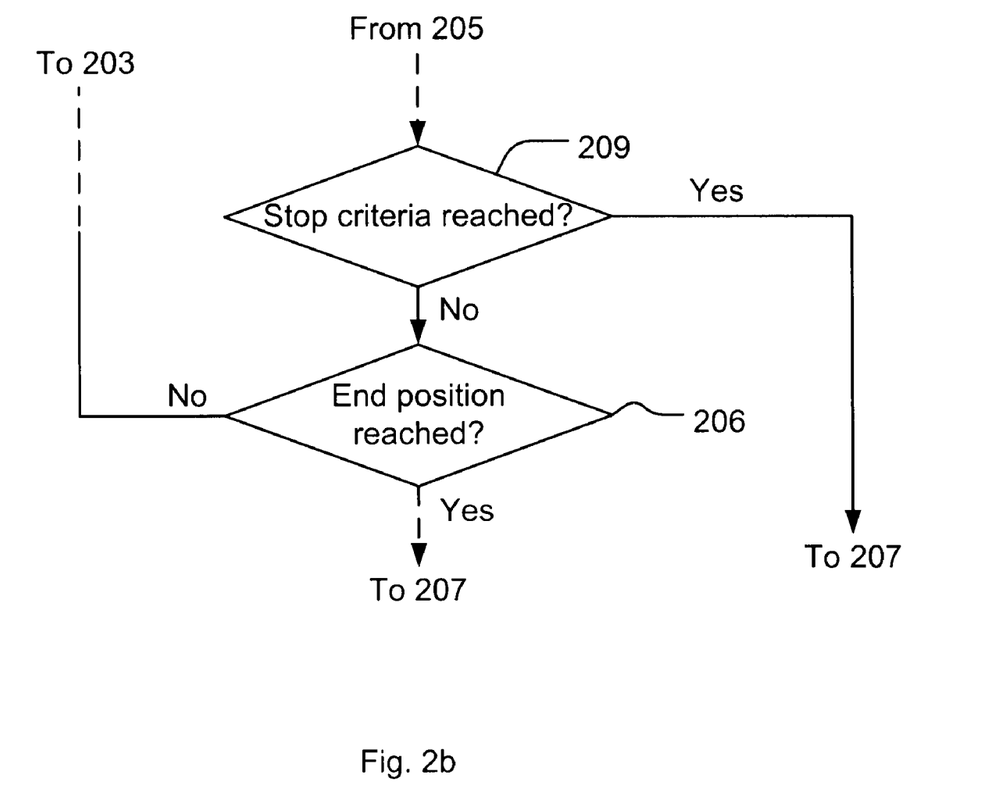
FIG. 2b shows a flowchart of a stop criteria that may be added to the flowchart in FIG. 2a according to an embodiment of the present invention.

In another embodiment of the present invention the calibration in FIG. 2a may be shortened by adding an additional stop criteria besides the "End position reached?" (flowchart step 206) stop criteria in FIG. 2a. In many cases steps (i.e. iris positions) with low HF values, for example the steps 45-50 in FIG. 4, may never be used in practice since they do not produce useful images. FIG. 2b shows an example of how an additional flowchart step 209 may be inserted between flowchart steps 205 and 206 in the flowchart shown in FIG. 2a. If a specific stop criteria is reached, before the 'End position reached?' at flowchart step 206 has been reached, the 'Record image' 203, 'Analyse image' 204 and 'Move towards end' 205 loop is terminated and the "End position reached?" flowchart step 206 is bypassed.

The stop criteria 209 in FIG. 2b may be implemented in several different ways. One way is to determine a single HF threshold value 400 for the determined HF value as illustrated in FIG. 4 by the vertical line 400. In the example in FIG. 4 the first determined HF value, corresponding to a fully open iris opening, has been set as the threshold value 400, and will consequently be the stop criteria. During the determination of the HF values, for every stepping motor step, the determined HF value will be compared with the HF threshold value. If the determined HF value is smaller than the HF threshold value 400 then the stop criteria of 209 in FIG. 2b is fulfilled.

A variant of choosing stop criteria 209 in FIG. 2b would be to let the user of the camera choose a suitable threshold value based on the scenario wherein the camera is going to be used, or any other criteria.

Yet another variant of choosing stop criteria 209 in FIG. 2b would be to determine the stop criteria 209 from the slope of the derivative as discussed in conjunction with FIG. 3b. The stopping criteria could in an embodiment for instance be a certain degree of negative slope of the derivative.

Yet another variant of choosing stop criteria 209 in FIG. 2b would be to observe the change in light between two (or more) images when determining the exposure time and gain values. If the light change is minimal (defined by a light threshold value), or non-existing, the stop criteria 209 would be fulfilled and the 'Record image' 203, 'Analyse image' 204 and 'Move towards end' 205 loop would be interrupted.

Yet another variant of choosing stop criteria 209 in FIG. 2*b* would be to stop at the stepping motor step where the diffraction starts 401, since using a smaller aperture than this value would result in poor image quality.

Figure 5:
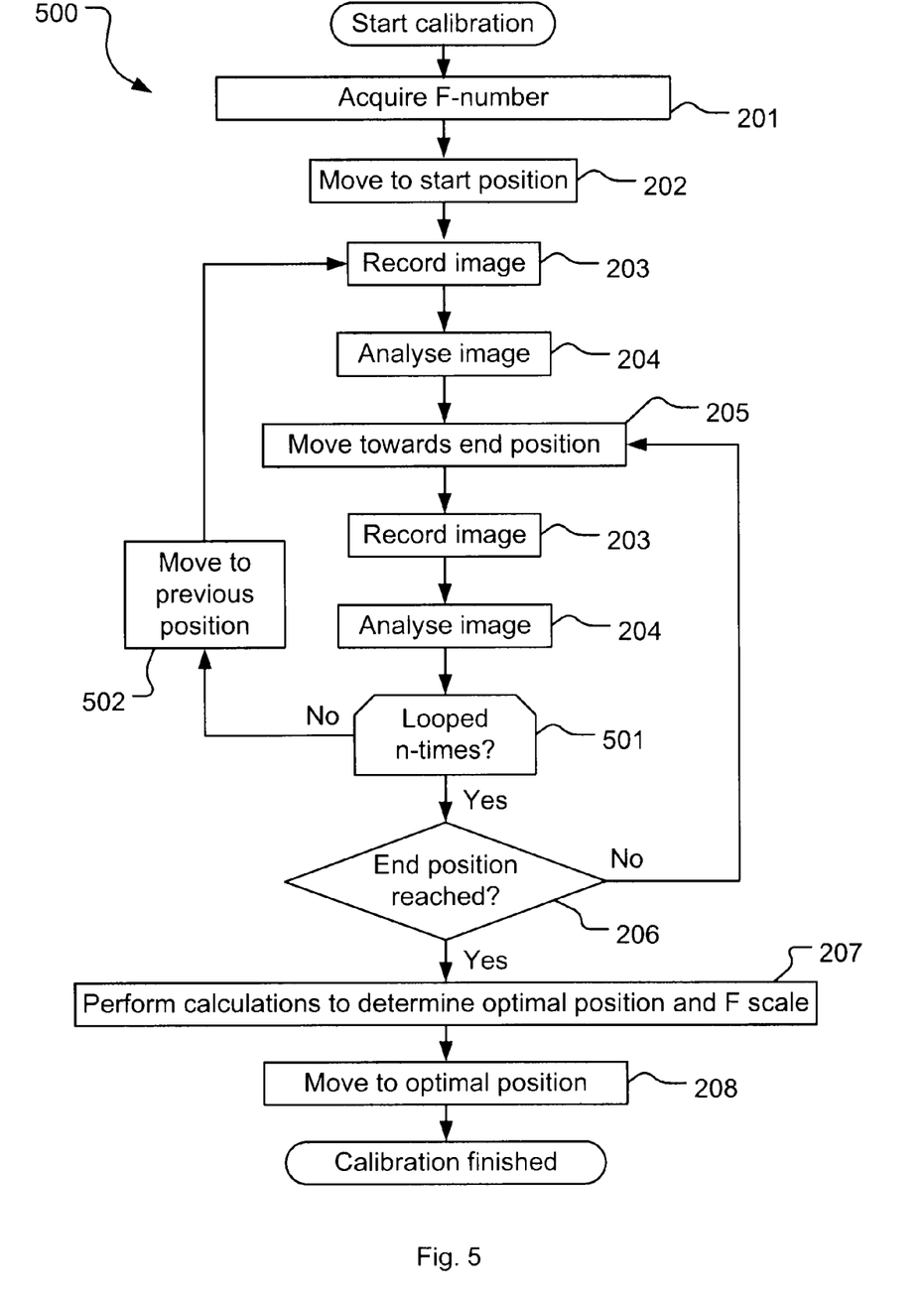
FIG. 5 shows a flowchart describing a calibration method for a camera using a P-Iris lens according to an embodiment of the present invention.

FIG. 5 shows a flowchart, of an alternative embodiment of the present invention, for performing a calibration of the camera. The flowchart steps 201-205, 206, 207 and 208 are the same, and thus perform the same tasks, as the flowchart steps with the same numbering in FIG. 2*a*. In this embodiment a flowchart step "Looped n-times" 501 and a flowchart step 'Move to previous position' 502 has been added. By adding these flowchart steps the calibration will go back and forth between two stepping motor steps n-number of times before moving to a new stepping motor step. An implementation of this flowchart scheme with n=1 may be as follows:

A first image or a first set of images are recorded at stepping motor step 1.

The stepping motor is moved to step 2, and a first image or a first set of images are recorded at step 2.

The stepping motor is moved back to step 1 and a second image or a second set of images are recorded.

The stepping motor is then moved to step 2 again, and a second image or a second set of images are recorded at step 2.

This procedure may be repeated n times, where n is a user defined or predefined number. In a variant the stop criteria for the looping in flowchart step 501 may be based on the light change in the image instead of a specific number of times. The stop criteria may for instance be 'until no further change of the light in the image is detected'.

When the loop has been repeated n times the stepping motor is moved one position (to step 3 in our example) and the loop is performed n times between step 2 and 3, and so on until we reach the 'End position reached?' flowchart step 206. This calibration scheme will effectively reduce noise and the negative effect of fast variations in light in the scene used for calibration. As discussed above, fast variations of the light in a scene may be due to objects such as cars, people and animals passing or moving in the scene.

In an embodiment of the present invention the calculations to determine the optimal position and F scale (in the flowchart shown in FIG. 2*a* and FIG. 5) may be performed on-the-fly at each step taken by the stepping motor instead of in flowchart step 207.

In another embodiment of the present invention all recorded images 203 may initially be stored in the memory without performing the analysis in flowchart step 204. When the end position is reached in flowchart step 206, or 509, the analysis according to flowchart step 204 may be performed before the calculations to determine the optimal position and F scale in flowchart step 207.

In another embodiment multiple calibrations according to the flowchart in FIG. 2*a* or FIG. 5 is performed in sequence. This will determine the optimal position with a higher accuracy, especially in situations where the images suffer from slow variations of the light in the scene used for calibration. As discussed above, a slow variation of the light in a scene may for instance be due to clouds passing in front of the sun.

Figure 6:
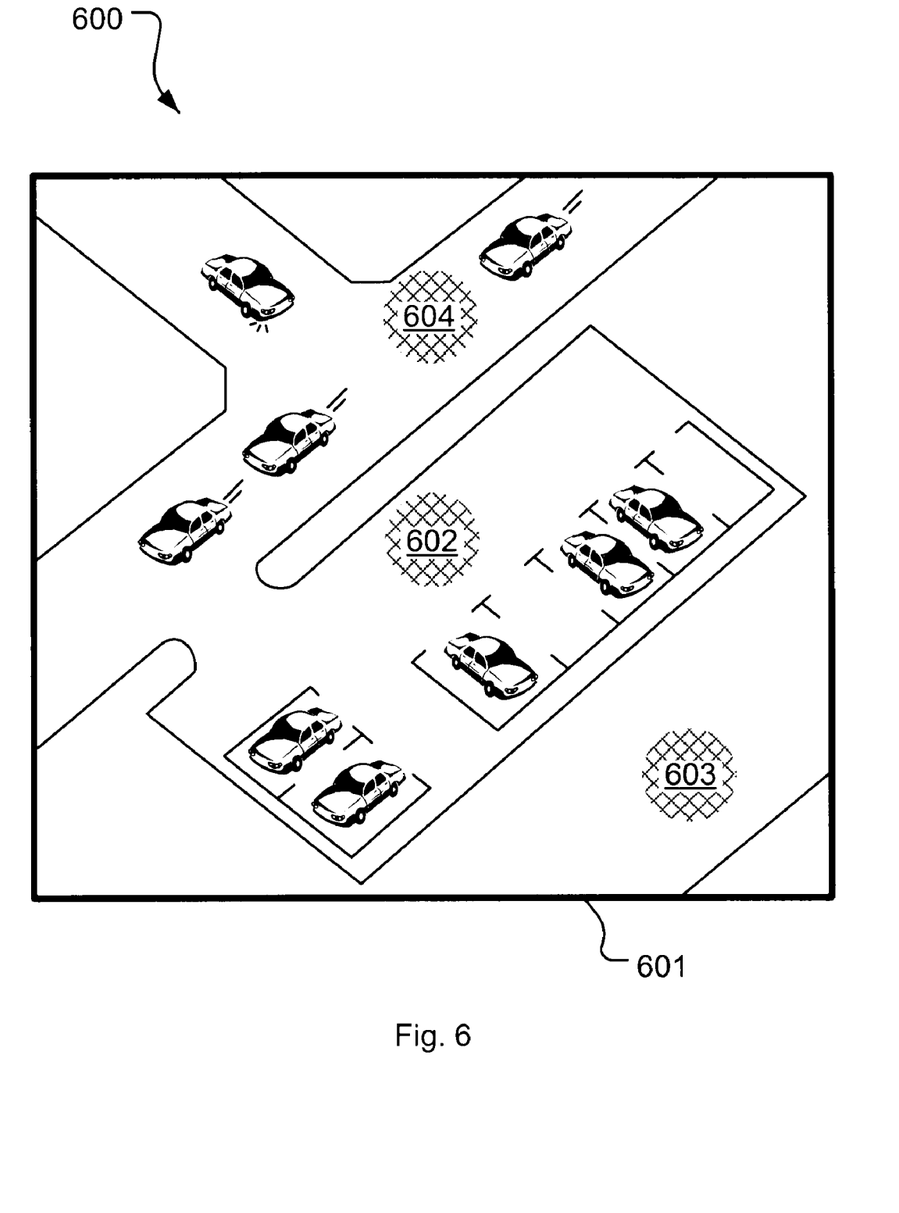
FIG. 6 illustrates how different subareas in an image may be selected to be used in a calibration of a P-Iris lens.

The analysis of a recorded image may be performed on the whole image or in only a part of the image. FIG. 6 shows a surveillance camera situated such that it records images of a car park and a street 601. The moving cars in the upper left part of the image 600 may give rise to fast variations of the light in the scene, thus affecting the calibration of a camera with a P-Iris lens in a negative way (as discussed above). However, by selecting a subarea in an image not containing any moving objects, and analysing only the subarea image instead of the whole image, the detrimental affect of the moving cars may be reduced or avoided. However, the subarea should be selected from, and cover most of, the scene that is going to be surveilled or else the calibration may be erroneous. In some cases it may be better to choose another time of day to perform the calibration rather than to perform the calibration using a faulty subarea.

There are several ways of determining a subarea in an image. One way is to always choose the centre of the image as illustrated by the hatched area 602 in FIG. 6. However, as shown by the example in FIG. 6 the light in the centre area 602 may be affected by cars trying to park. The hatched area 604 in the upper left is even worse since this area corresponds to a street where cars constantly move in and out of the subarea. In this example the best position to choose may be the hatched area 603 in the lower right of the image which seems to be the most stable in terms of fast variations of the light (slow variations of the light such as the sun going in and out of clouds excluded). The selection of subareas may either be done manually by a user, automatically by applying motion detection to the image and choosing an area with the least movement in, or doing a light analysis on a series of images and choosing the subarea with the least amount of light variation. In a variant, the subarea that is chosen is excluded from the analysis. The selected subarea may be of an arbitrary size and shape. A subarea may constitute several smaller subareas.

Figure 7:
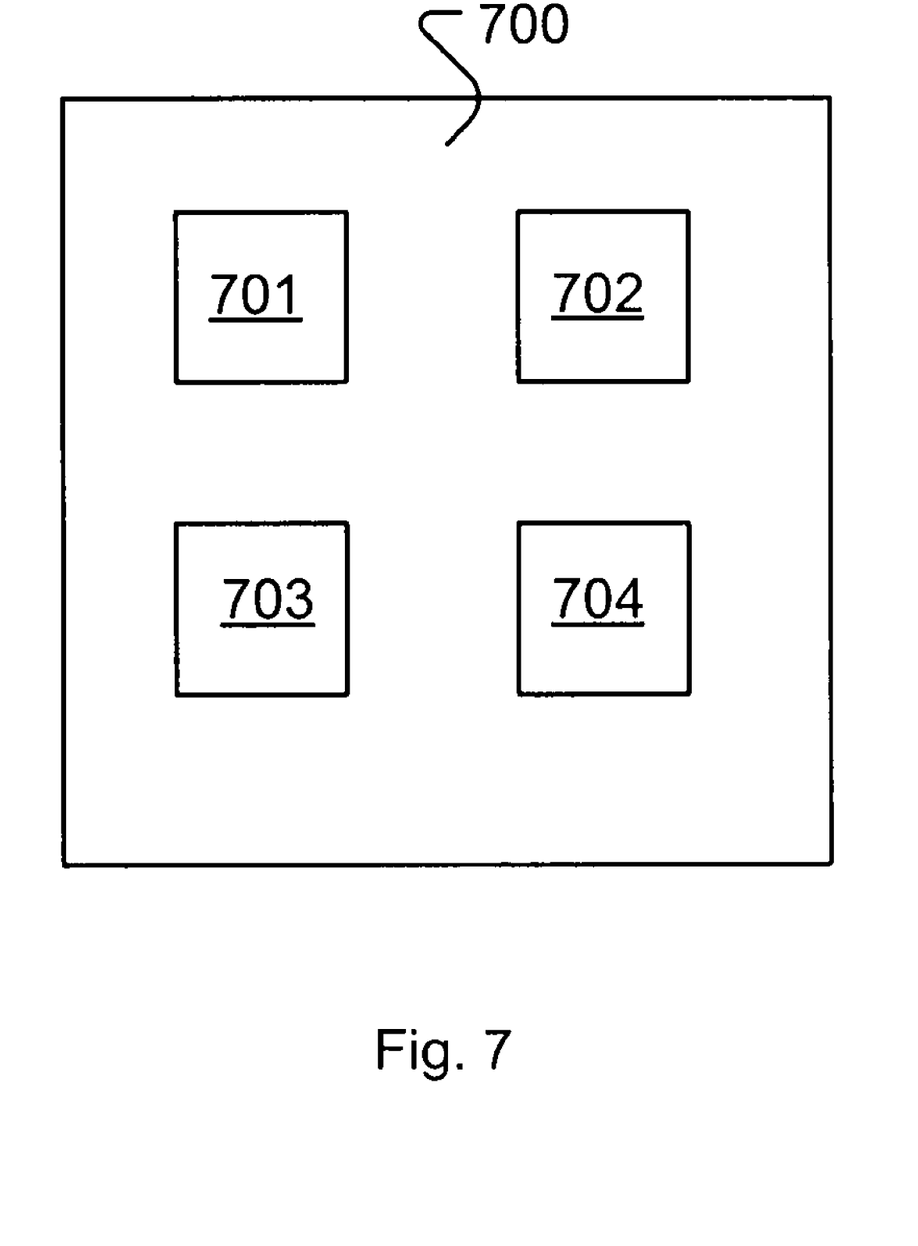
FIG. 7 shows a block diagram of a computer-readable medium with computer-executable components comprising instructions for calibrating a camera with a P-Iris lens according to an embodiment of the present invention.

FIG. 7 shows a computer-readable medium 700 having computer-executable components comprising instructions for performing all aspects of the calibration method for a camera having a P-Iris lens described by the embodiments above and in FIGS. 1 to 6. It may especially have instructions for adjusting the size of the iris opening between a first opening position and a second opening position 701, recording a plurality of images 702 during said adjusting, analyzing said images 703, and determining an iris opening 704 based on said analysis that obtains a high quality image. The computer-readable medium 700 may be housed internally in the camera or externally of the camera.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method in a camera including a lens device having an adjustable iris opening, comprising:
   adjusting a size of the iris opening between a first opening position and a second opening position;
   recording a plurality of images during said adjusting;
   analyzing said images, said analyzing including:
   determining high frequency content in said recorded images,
   determining a high frequency value for each of said recorded images based on said determined high frequency content, and
   determining information representative of the size of the iris opening corresponding to a recorded image with a specific high frequency value; and
   based on said analysis, determining an iris opening, that obtains a high quality image.

2. The method according to claim 1, wherein the recorded image with the specific determined high frequency value is the recorded image with the highest high frequency value.

3. The method of claim 1, wherein the determining high frequency content includes:
   selecting subareas in the recorded images, and
   measuring the high frequency content in the selected subareas.

4. The method according to claim 1, wherein the analyzing further includes:
   acquiring an absolute F-number corresponding to a specific iris opening,
   determining an exposure time and an image sensor gain in said recorded images, and
   calculating, based on the determined exposure time, image sensor gain, and said absolute F-number, a correlation curve between a sequence of steps, wherein each step represents a specific size of the iris opening and a sequence of F-numbers of the lens device.

5. The method of claim 4, wherein the determining the exposure time and the image sensor gain includes:
   selecting subareas in the recorded images, and
   measuring an exposure time and an image sensor gain in the selected subareas.

6. The method according to claim 4, further comprising:
   determining a first F-number that is a highest F-number to obtain a high quality image with a predetermined level of light; and
   determining a second F-number that corresponds to said specific high frequency value, wherein
   when the first F-number is lower than the second F-number, the determining of the iris opening is based on the first F-number, and
   when the first F-number is higher than the second F-number, the determining of the iris opening is based on the second F-number.

7. The method according to claim 1, wherein the adjusting includes providing a sequence of control signals to the lens device, and
   the sequence of control signals corresponds to a sequence of steps, each step representing a specific size of the iris opening.

8. The method according to claim 1, wherein the first opening position is smaller than the second opening position.

9. The method according to claim 1, wherein the first opening position is larger than the second opening position.

10. A camera comprising:
    a lens device having an adjustable iris opening;
    a first adjusting unit that adjusts a size of the iris opening between a first opening position and a second opening position;
    a recording unit for recording that records a plurality of images during said adjusting;
    a first determining unit that determines high frequency content in said recorded images;
    a second determining unit that determines a high frequency value for each of said recorded images based on said determined high frequency content;
    a third determining unit that determines information representative of the size of the iris opening corresponding to a recorded image with a specific high frequency value;
    an analysing unit that analyzes said images; and
    a fourth determining unit that determines an iris opening, based on said analysis, that obtains a high quality image.

11. The camera according to claim 10, wherein the third determining unit determines the recorded image with the specific high frequency value to be the recorded image with a highest high frequency value.

12. The camera of claim 10, wherein the first determining unit includes;
    a selecting unit that selects subareas in the recorded images, and
    a fifth determining unit that determines high frequency content in the selected subareas.

13. The camera according to claim 10, further comprising:
    an acquiring unit that acquires an absolute F-number corresponding to a specific iris opening;
    a sixth determining unit that determines, from the recorded images, an exposure time and an image sensor gain; and
    a calculating unit that calculates, based on the determined exposure time, said image sensor gain, and said absolute F-number, a correlation curve between a sequence of steps, wherein each representing represents a specific size of the iris opening and a sequence of F-numbers of the lens device.

14. The camera of claim 13, wherein the second determining unit further includes:
    a selecting unit that selects subareas in the recorded images, and
    a seventh determining unit that determines an exposure time and an image sensor gain in the selected subareas.

15. The camera according to claim 13, further comprising:
    an eighth determining unit that determines a first F-number that is a highest F-number to obtain a high quality image with a predetermined level of light;
    a ninth determining unit for determining that determines a second F-number that corresponds to said specific high frequency value; and
    a second adjusting unit that adjusts the iris opening, wherein the adjusting of the iris opening is based on the first F-number when the first F-number is lower than the second F-number, or the second F-number when the first F-number is higher than the second F-number.

16. The camera according to claim 10, wherein the adjusting unit includes a providing unit that provides a sequence of control signals to the lens device,
    wherein the sequence of control signals corresponds to a sequence of steps, each step representing a specific size of the iris opening.

17. A non-transitory computer-readable medium encoded with instructions which, when executed by a processor, cause the processor to execute a method for a camera, said method comprising:

adjusting a size of the iris opening between a first opening position and a second opening position;

recording a plurality of images during said adjusting;

analyzing said images including determining high frequency content in said recorded images, determining a high frequency value for each of said recorded images based on said determined high frequency content, and determining information representative of the size of the iris opening corresponding to a recorded image with a specific high frequency value; and determining an iris opening, based on said analysis, that obtains a high quality image.

18. A camera comprising:

a lens device having an adjustable iris opening;

an adjusting unit that adjusts a size of the iris opening between a first opening position and a second opening position;

a recording unit that records a plurality of images during said adjusting;

an analyzing unit that analyzes said images to determine high frequency content in said recorded images, a high frequency value for each of said recorded images based on said determined high frequency content, and information representative of the size of the iris opening corresponding to a recorded image with a specific high frequency value; and a determining unit that determines an iris opening, based on said analysis, that obtains a high quality image.

* * * * *